United States Patent [19]

Richards

[11] Patent Number: 4,735,390

[45] Date of Patent: Apr. 5, 1988

[54] SUPPORT LEG JOINT CONSTRUCTION WITH BRACING

[76] Inventor: Peter S. Richards, 100 Mt. Si Pl., NW., Issaquah, Wash. 98027

[21] Appl. No.: 47,051

[22] Filed: May 6, 1987

[51] Int. Cl.⁴ .............................................. F16M 11/16
[52] U.S. Cl. .................................... 248/188; 108/156
[58] Field of Search ..................... 248/188, 677, 188.8; 403/231, 245, 227, 104; 108/156; 297/440, 445; 5/316

[56] References Cited

U.S. PATENT DOCUMENTS

| | | | |
|---|---|---|---|
| 892,839 | 7/1908 | Innes | 108/156 |
| 1,675,827 | 7/1928 | Shrader | 108/156 |
| 1,762,776 | 6/1930 | Gardner | 108/156 X |
| 1,806,169 | 5/1931 | Kohler | 108/156 X |
| 2,730,419 | 1/1956 | Watrous | 248/188 |
| 2,901,301 | 8/1959 | Johnson | 108/156 |
| 3,063,765 | 11/1962 | Huff | 108/156 UX |
| 3,322,384 | 5/1967 | Rodwell | 248/188 |
| 3,506,227 | 4/1970 | Jenkins | 248/59 |
| 3,530,804 | 9/1970 | Broome | 108/156 |
| 3,784,254 | 1/1974 | Longato | 297/445 |
| 3,966,340 | 6/1976 | Morris | 403/353 |
| 4,662,591 | 5/1987 | Encontre | 403/104 X |

*Primary Examiner*—J. Franklin Foss
*Attorney, Agent, or Firm*—Delbert J. Barnard

[57] ABSTRACT

A support leg (16) includes an insert (20) within a tubular upper portion (18). Threaded engagement is made between the threaded opening (22) in the insert (20) and a stud (14) which is welded at its upper end to an overhead structure (10). The tubular portion (18) extends through an opening in the small end (34) of a conical brace member (32). The small end (34) of member (32) is welded (38) to the member (16). A large diameter upper end (36) of brace member (32) extends axially outwardly beyond the end (42) of member (16). Rotation of member (16) relative to the stud (14) tightens the screw joint (14, 22) and forces the upper end (36) of brace member (32) into tight contact with the overhead member (10). The weld (44) is harder than the member (16), resulting in a galling of the upper end (42) of member (16), during the rotation. This galling makes a tight contact fit between end (42) and weld bead (44). This type of fit braces the member (16) against upper end sideways movement in response to a sideways load on member (16).

6 Claims, 2 Drawing Sheets

SUPPORT LEG JOINT CONSTRUCTION WITH BRACING

DESCRIPTION

1. Technical Field

This invention relates to a threaded joint construction between two members, and in particular to a screw joint construction between a threaded stud depending from an overhead structure and an end portion of an elongated support leg, and to a simple structure and arrangement for bracing the threaded joint to increase its capacity to withstand sideways loads applied on the support leg and protect it against shock loads and vibration.

2. Background Art

The present invention was made as a part of an effort to provide an improved mounting structure for a suspended object (e.g. a lighting fixture). It is believed that the joint construction of the invention has general utility. However, it is known to have particular application for connecting the upper end of a support leg for a light fixture to an overhead structure in a ship.

Ship construction is done in stages. Quite often, a component is installed and then it is discovered that the component must be removed in order to either install another component, or perform some other stage of the construction of the ship. Light fixtures must be securely afixed to the ceiling structure and this has in the past been done by welding the upper ends of support leg members to a metal ceiling structure and then welding cross members to the lower ends of the support leg members, and then bolting the light fixtures to the cross members. When a mounting structure was installed in this way it became necessary to remove it in a destructive manner, such as by use of a cutting torch. The mounting structure of the present invention provides a way of easily connecting and disconnecting the support leg member to the ceiling structure, so that if it becomes necessary to remove the support leg structure, it can be done without distructive effects to this component, so that such component can be reused. The mounting structure of the present invention makes it easy to raise or lower a lighting fixture or similar object. The mounting structure may only be disassembled and then reassembled with a longer or shorter leg member.

DISCLOSURE OF THE INVENTION

In basic form, the joint construction of the present invention comprises a rod member which depends from an overhead member and includes a threaded portion. An elongated support leg is provided. The support leg has a tubular upper portion in which an insert is provided. The insert has a threaded longitudinal opening for threaded engagement with the threads on the depending member, to form a screw joint. A brace member is provided at the upper end of the support leg. The brace member includes a lower small end and an upper large end. An opening is formed in the small end through which an upper portion of the support leg extends. The base member is connected to the support leg at a location spaced axially downwardly from the upper end of the support leg. The brace member has a circular edge at its upper end which is substantially larger in diameter than the support leg. The edge is positioned to make contact with the overhead member when the support leg is installed on the depending member and the screw joint is tightened.

In accordance with an aspect of the invention, the insert includes an upper end spaced axially inwardly of the support leg from the upper end of the support leg, and a lower opposite end. The support leg decreases in diameter through regions both above and below the insert, for in that manner retaining the insert in place within the support leg.

In accordance with another aspect of the invention, the upper end of the support leg is spaced axially inwardly from the circular edge at the upper end of the brace member, so that the support leg can be rotated to tighten the screw joint between the insert and the depending member and such tightening will force the circular upper edge of the brace member into tight contact with the overhead member without the upper end of the support leg member reaching the level of the overhead member.

In preferred form, the upper end of the depending member is welded to the overhead member and a fillet weld surrounds the upper end of the depending member. The support leg includes a circular edge at its upper end positioned to contact the fillet weld as the support leg is being rotated to tighten the screw joint between the insert and the depending member. Galling occurs at the location of contact between the fillet weld and the upper end of the support leg, such that metal is deformed and a tight fit is made between the upper end of the support leg and the fillet weld. This tight fit serves to laterally brace the upper end of the support leg, so as to resist the tendancy of the support leg to rotate in position about its connection with the lower end of the brace member in response to sideways loads applied to the support leg below the brace member.

The use of the brace member in compression as a "preload" on the joint is an important aspect of the invention. The preload compression absorbs shock load spikes and various forms of vibration. Stated another way, the use of a preloaded brace member protects the depending member from traumatic failure due to shock load spikes. The brace member is also resilient enough to absorb structural vibration. Such vibration is absorbed and thus not transmitted to the depending member.

An important feature of the support leg joint construction is that the amount of preloading of the brace member can be controlled by the selection of the diameter of its upper end. As will be apparent, rotation of the support leg member will cause the upper circular edge of the brace member to bear against the overhead member. The support leg can be rotated until the pressure exerted by the upper end of the brace member against the overhead support prevents further rotation by muscle energy. The resistance to further rotation signals a stopping point to the application of a rotation.

In preferred form, the support leg is formed to include wrench flats below the inserts, to receive jaws of a wrench for rotating the support leg.

Other more detailed features of the invention are described below in connection with the description of the illustrated embodiment.

BRIEF DESCRIPTION OF THE DRAWING

Like reference numerals are used to designated like parts throughout the several views of the drawing, and.

BEST MODE FOR CARRYING OUT THE INVENTION

Figures 1, 2:
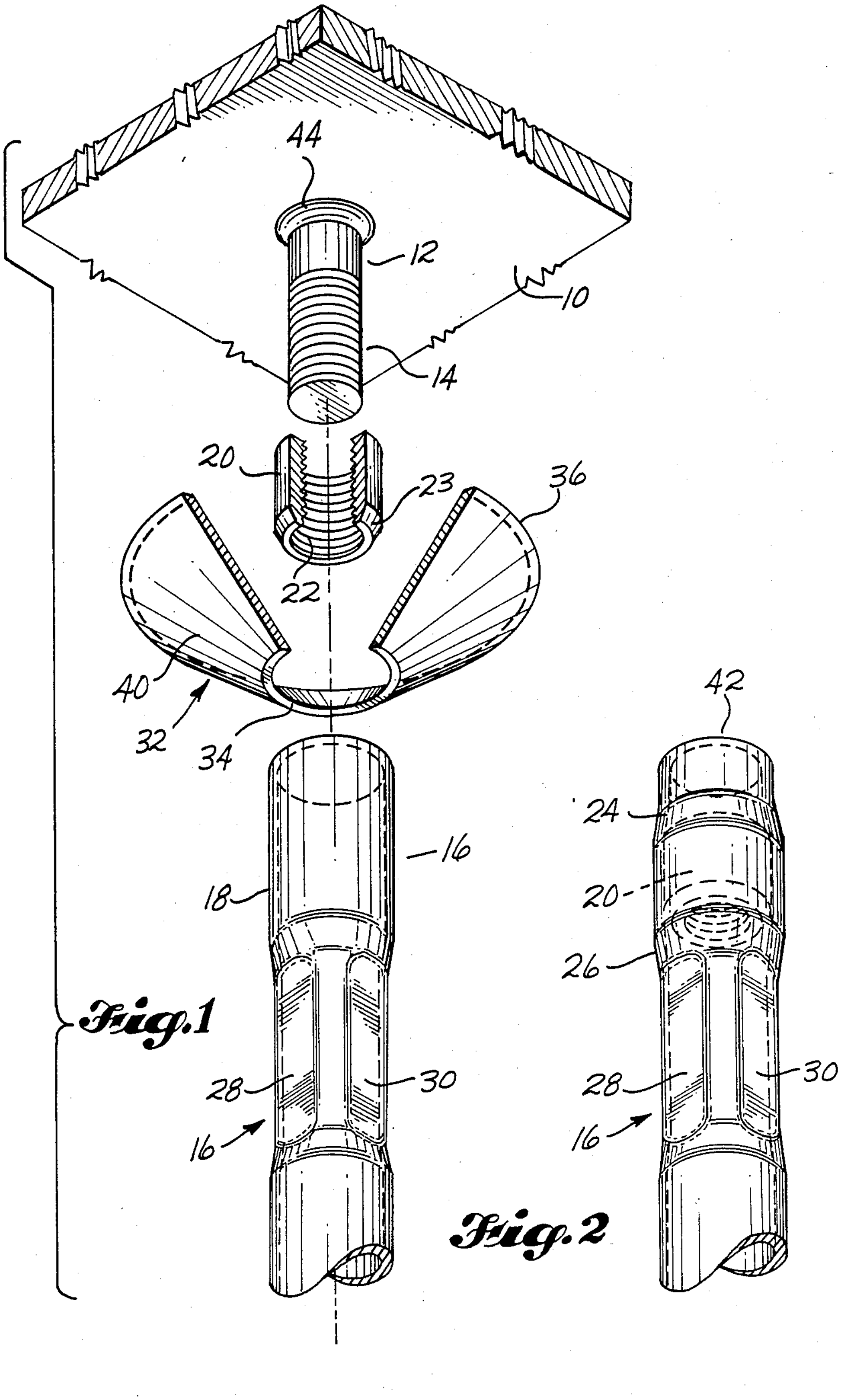
FIG. 1 is an exploded isometric view of the joint construction of the present invention.
FIG. 2 is an assembled isometric view of the support leg with the brace member omitted.

Referring to FIG. 1, member 10 is an overhead structure, e.g. a metal ceiling panel. A rod member or stud 12 is secured at its upper end to the member 10, such as by stud welding, and depends vertically from the member 10. Rod member 12 includes a threaded portion 14.

An elongated support leg 16 is screw connected to the member 14. Support leg 16 includes an upper end portion 18 which is tubular and in which an insert 20 is received. Insert 20 is secured in position to the support leg 16 and includes a threaded longitudinal opening 22 which makes threaded engagement with the threads 14 on member 12, to form a screw joint. The inner end of insert 20 is beveled to help guide insert 20 into tubular portion 18.

Figure 3:
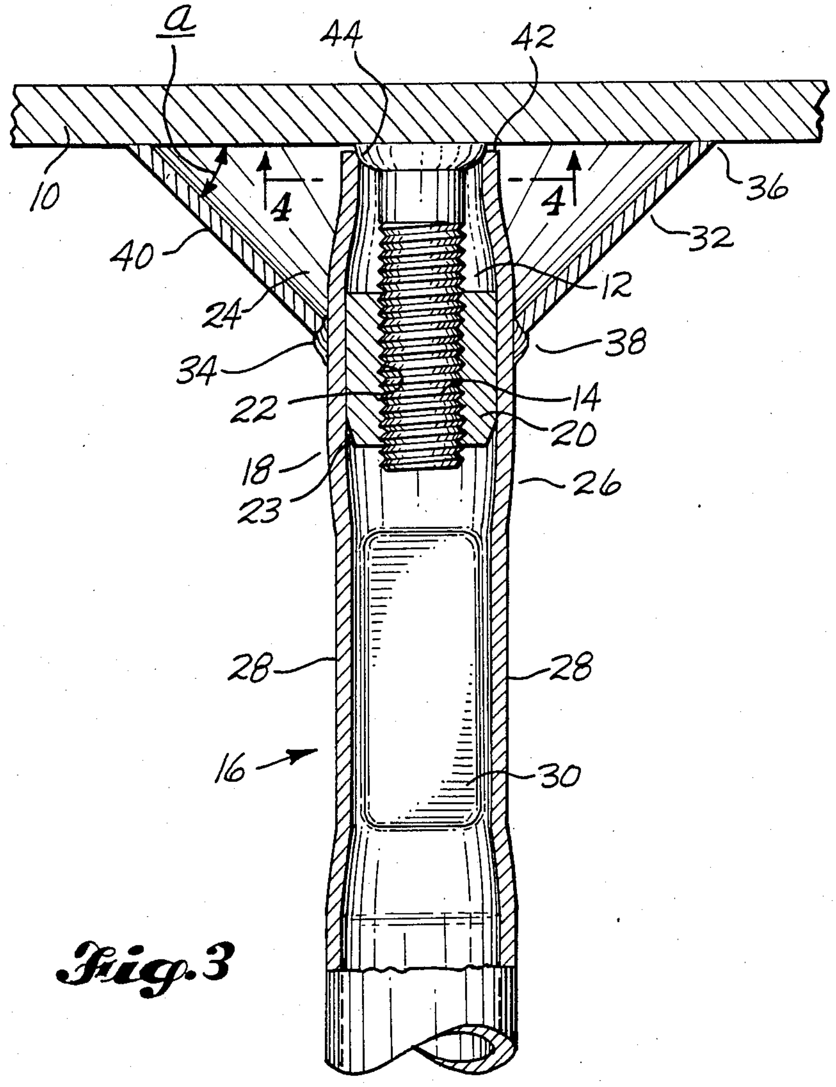
FIG. 3 is a vertical sectional view of the joint construction.

The tubular portion 18 is swaged onto the insert 20. As illustrated by FIG. 3, its portion 24 above the insert 20 and its portion 26 below the insert 20 are reduced in diameter to in that manner prevent member 20 from moving upwardly or downwardly within the tubular portion 18. Preferably, the support leg 16 is formed to include at least one pair of opposed wrench flats 28, below the insert 20. The illustrated embodiment also comprises a second pair of wrench flats 30.

In accordance with the invention, a brace member 32 is provided at the upper end of the support leg 16. Brace member 32 has a small diameter lower end 34 and a large diameter upper end 36. A sidewall 40 extends between the ends 34, 36. Sidewall 40 increases in diameter as it extends upwardly from the lower end 34 to the upper end 36. Brace member 32 may be a conical member, as illustrated.

As illustrated, the small end 34 of brace member 32 includes a central opening through which the upper portion of leg member 16 extends. The brace member 32 is connected to the leg member 16, preferably by the weld bead 38 extending about the upper end portion 18 of member 16, radially outwardly from a portion of the insert 20. The weld bead 38 extends between the small end 34 of brace member 32 and the outer surface of wall portion 18.

Preferably, the width of the brace member 32 at the upper end 36 is between 2.5–3.5 times the diamter of the support leg 16 at its upper end 40 and between 2.5–3.5 times the length of the brace member 32. The particular brace member 32 that is illustrated includes a sidewall 40 which makes an angle a of about 45° with respect to the member 10. This is a preferred angle for a conical brace member. However, the angle may vary somewhat from one installation to another.

In accordance with an aspect of the invention, the brace member 32 extends axially above the end surface 40 of the support leg 16 so that such end surface 40 is axially spaced from member 10 at the time of contact of the upper edge 36 of brace member 32 with the member 10.

Figure 4:
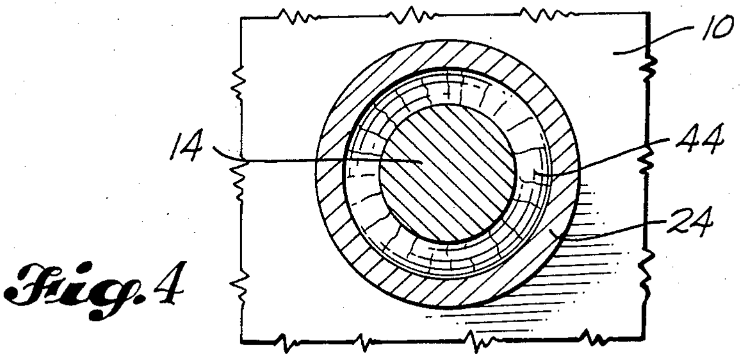
FIG. 4 is a sectional view taken substantially along line 4—4 of FIG. 3.

As shown by FIGS. 1, 3 and 4, the upper end of member 12 may be connected to member 10 by a fillet weld 44. The internal diameter at the upper end 42 of member 16 is larger than the diameter of member 12. However, it is smaller than the maximum diameter of the weld so that the upper end 42 of member 16 contacts the weld 44 before it contacts the member 10.

Support leg 16 is lifted upwardly to place its open upper end into alignment with member 12. Then, member 16 is moved over member 12 so as to bring the threads 14 to the upper end of opening 22. The member 16 is then rotated for the purpose of screwing member 20 onto member 12. Initially rotation is by hand. The member 16 is rotated until the upper edge 36 of brace member 32 contacts or is in close contact with the member 10. At about the same time the upper end 42 of tubular portion 18 makes contact with the weld fillet 44. Rotation of member 16 is continued. A wrench may be used on the wrench flats 28, 30, if necessary. As member 16 is rotated, galling occurs where tubular end 42 makes contact with the weld fillet 44. The weld is harder than the tubing material and so the tubing material is galled. A gap between the end 42 and member 10 makes it possible to draw the edge 36 into tight contact with member 10. The galling which occurs at the end 42 and fillet weld 44 shapes these parts to fit tightly together. This interfit serves to brace the upper end 42 of member 16 against sideways movement in response to a sideways load on member 16 below weld joint 38. As will be appreciated, when the joint is tightened and the upper end 36 of brace member 32 is tight against overhead member 10, a lateral force applied on member 16 at any appreciable distance below weld joint 38 will want to rotate the member 18 in position about weld joint 38, putting stress on such weld joint 38. The tight interfit between the upper end 42 and the weld fillet 44 resists such rotation and thus relieves stress that would otherwise be on the weld joint 38.

As the screw joint 14, 22 is tightened, the brace member 32 is put into compression. It in effect functions like a large Bellevue spring. This putting of the member 32 in compression acts to preload the joint. In some installations, a screw joint can be "preloaded" by tightening the threaded connection until the threaded bolt member is elongated. This type of putting a bolt member in tension acts to preload the joint. This method cannot be relied on where the joint involves a stud that is welded to a base member. If the stud is harder material than the base member, the tightening of the threaded connection would act to deform the base member instead of putting the stud in tension. The supplier of a support leg has no control over the make-up of the stud member and the base member. However, he does have control over the construction of the support leg. The present invention allows the supplier of the support leg to provide a way of preloading the threaded joint which is always reliable.

The use of the member 32 in compression as a "preload" on the joint is very important. The preload compression member 32 absorbs shock load spikes and various forms of vibration. Stated another way, the use of the preload cone 32 protects the stud 14 from traumatic failure due to shock load spikes. Member 32 is also resilient enough to absorb structural vibration. Such vibration is absorbed and thus not transmitted to the stud 14. The stud 14, the weld 44 and the support leg 16 carry the shear loads. These members have excellent shear load carrying capacity. The preload cone 32 absorbs the rip and tear loads.

An important feature of the support leg joint construction of the invention is that the amount of preloading of the cone member 32 can be controlled by the selection of the diameter of the end 36. As will be apparent, rotation of support leg member 16 will cause the circular edge at end 36 to bear against member 10. Member 16 can be rotated until the pressure of end 36 against member 10 prevents further rotation by muscle energy applied by a wrench to the wrench flats 28, 30. The resistance to further rotation signals a stopping point to the application of a rotation causing force on member 16. This occurs before the tube end 42 to bottoms against the member 10.

The lower end of support leg 16 is not illustrated. A number of different types of articles could be secured to the lower end of member 16. For example, a mounting strap for an electrical light fixture may be connected to the lower end of member 16 by means of the insert type connector assembly that is disclosed and claimed in my copending application Ser. No. 811,939 filed Dec. 20, 1985, and entitled Joint Construction and Overhead Hanger.

In accordance with the established laws of patent interpretation, the embodiment that has been illustrated and described has been submitted by way of example only. The scope of protection provided by the patent is to be determined by the terms of the following claims, and by the doctrine of equivalents.

What is claimed is:

1. A joint construction, comprising:

an overhead member;

a rod member depending from said overhead member having an upper end connected to the overhead member and a threaded portion;

an elongated support leg having a tubular upper portion, an upper end, and an insert in said tubular upper portion having a threaded longitudinal opening for threaded engagement with the threads on said depending member, to form a screw joint; and a brace member at the upper portion of said support leg, said brace member including a small lower end a large upper end, an opening in its lower end through which the upper portion of the support leg extends, and an annular wall between the upper and lower ends;

means connecting the lower end of the brace member to said support leg at a location spaced axially downwardly from the upper end of the support leg;

said brace member having a circular edge at its upper end which is substantially larger in diameter than said support leg, said edge being positioned to make pressure contact with the overhead member when the support leg is installed on the depending member and the screw joint is tightened.

2. A joint construction according to claim 1 wherein the brace member has an upper end diameter which is between 2.5–3.5 times the diameter of the support leg where the support leg is connected to the small end of the brace member.

3. A joint construction according to claim 1, wherein the insert includes an upper end spaced axially inwardly of the support leg from the upper end of the support leg, and a lower opposite end, and wherein said support leg decreases in diameter through regions both above and below the insert, for in that manner retaining the insert in place within the support leg, and the lower end of the brace member is connected to the support leg at a location between the upper and lower ends of the support leg.

4. A joint construction according to claim 1, wherein the upper end of the support leg is spaced axially inwardly from the circular edge at the upper end of the brace member, so that the support leg can be rotated to tighten the screw joint between the insert and the depending member and such tightening will force the circular upper edge of the brace member into tight contact with the overhead member to put the brace member in compression without the upper end of the support leg member reaching the level of the overhead member.

5. A joint construction according to claim 4, wherein the upper end of the depending member is welded to the overhead member and a weld filet surrounds said upper end of the depending member, and wherein the support leg includes a circular edge at its upper end positioned to contact said weld filet as the support leg is being rotated to tighten the screw joint between the insert and the depending member, wherein said weld fillet is a harder material than the upper end of the support leg.

6. The joint construction according to claim 5, wherein the support leg is formed to include wrench flats below said insert, to receive jaws of a wrench for rotating the support leg.

* * * * *

UNITED STATES PATENT AND TRADEMARK OFFICE
CERTIFICATE OF CORRECTION

PATENT NO. : 4,735,390
DATED : April 5, 1988
INVENTOR(S) : Peter S. Richards It is certified that error appears in the above-identified patent and that said Letters Patent is hereby corrected as shown below:

Column 1, line 30, "afixed" should be -- affixed --.

Column 1, line 43, "distructive" should be -- destructive --.

Column 3, line 51, "diamter" should be -- diameter --.

Column 3, line 55, "a" should be -- a --.

Column 5, line 9, after "tube end 42", delete "to".

Claim 1, column 5, line 39, after "lower end", insert a comma.

Claim 5, column 6, line 35, "filet" should be -- fillet --.

Claim 5, column 6, line 38, "filet" should be -- fillet --.

Signed and Sealed this

Third Day of October, 1989

*Attest:*

DONALD J. QUIGG

*Attesting Officer*

*Commissioner of Patents and Trademarks*